United States Patent [19]
Job

[11] Patent Number: 5,339,563
[45] Date of Patent: Aug. 23, 1994

[54] NON-TOXIC INSECT CAPTURE AND KILLING APPARATUS

[76] Inventor: Frank Job, P.O. Box 144, Avalon, Calif. 90704

[21] Appl. No.: 643,861

[22] Filed: Jan. 22, 1991

[51] Int. Cl.$^5$ .............................................. A01M 1/02
[52] U.S. Cl. ......................................... 43/122; 43/107
[58] Field of Search ........................... 43/107, 114, 122

[56] References Cited

U.S. PATENT DOCUMENTS

| | | | |
|---|---|---|---|
| 161,814 | 4/1875 | Nelson | 43/122 |
| 983,977 | 2/1911 | Lilge | 43/122 |
| 1,858,087 | 5/1932 | Howard | 43/122 |
| 1,900,199 | 3/1933 | Pickett | 43/107 |
| 4,551,941 | 11/1985 | Schneidmiller | 43/107 |
| 4,794,724 | 1/1989 | Peters | 43/122 |
| 4,858,374 | 8/1989 | Clemons | 43/122 |

*Primary Examiner*—Kurt Rowan
*Attorney, Agent, or Firm*—John E. Halamka

[57] ABSTRACT

An apparatus which may use non-toxic, non-solid attractant and non-toxic, non-solid material to kill attracted insects. A base is formed as a tapered cylinder with a solid bottom. The attractant is poured onto the bottom. Access holes are formed in the sides of the base above the bottom so that the attractant does not leak out. An insert is fabricated of a truncated hollow cone and an apron to form a trough in which diatomaceous earth may be poured and placed inside the base forming an attractant chamber below the insert and an killing chamber above the insert. A cover encloses the insert inside the base. The insect enters the access hole to drink the attractant, flies up the inside of the hollow cone, enters the killing chamber through tile truncated cone top. Upon contact with the diatamesous earth in the trough, the insect is inflicted with cuts, looses bodily fluids and dies.

3 Claims, 1 Drawing Sheet

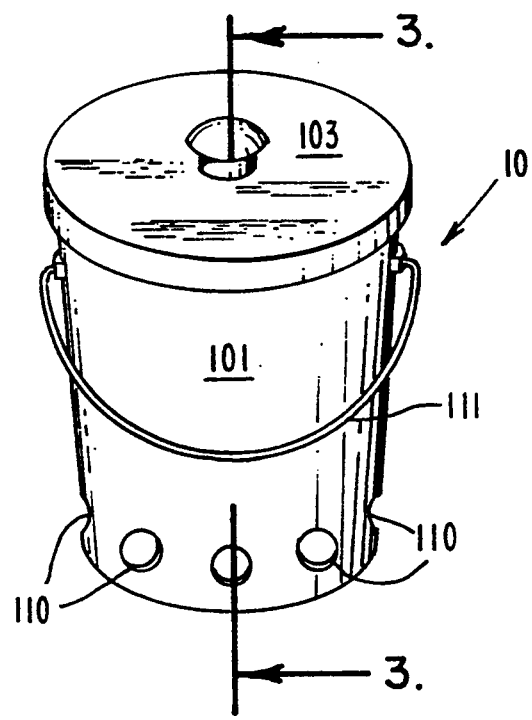
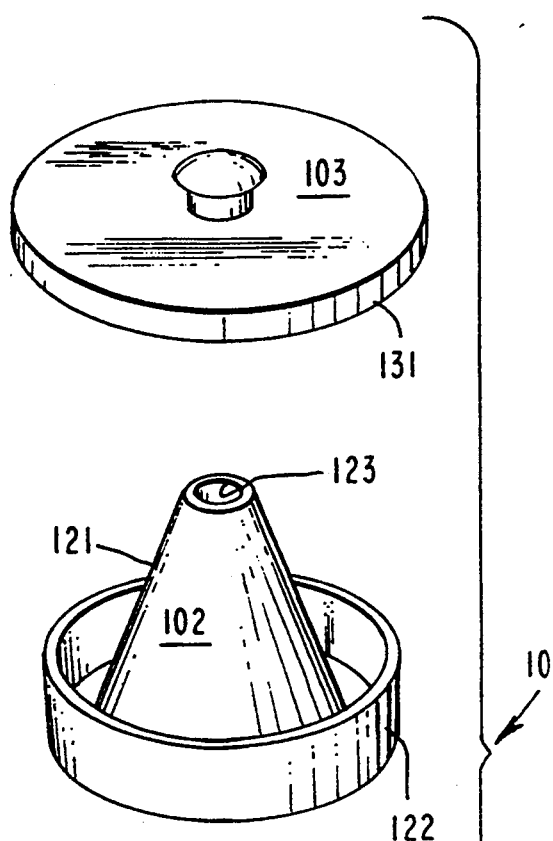
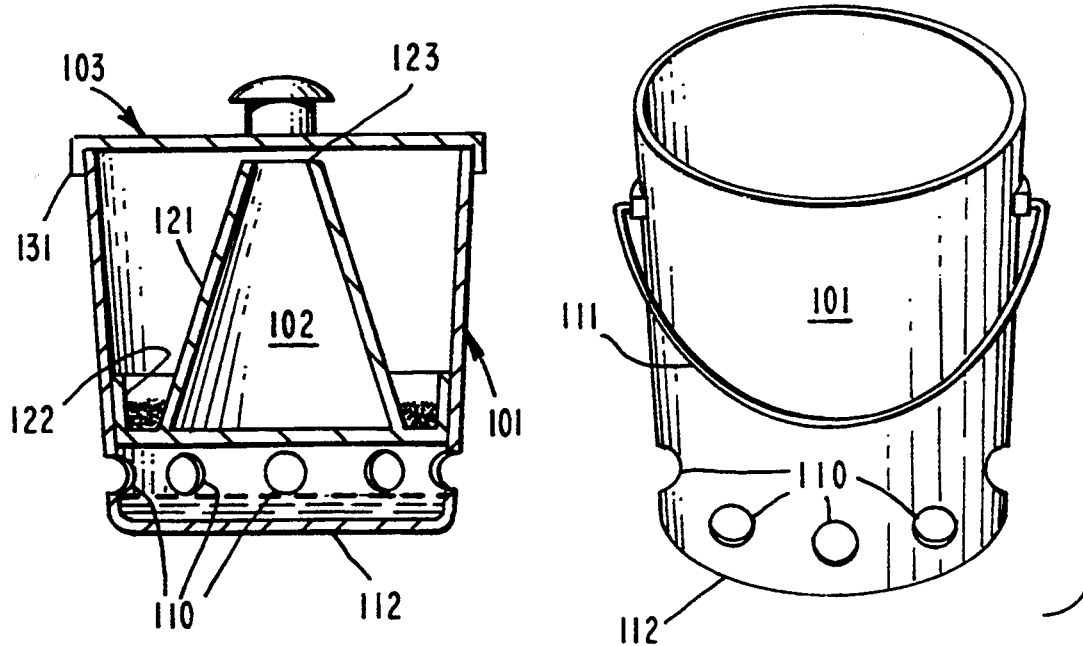

NON-TOXIC INSECT CAPTURE AND KILLING APPARATUS

BACKGROUND OF THE INVENTION

1. Field of the Invention

This invention relates to the art of insect control, and more particularly, to an improved apparatus which may be used in conjunction with non-toxic attractant and non-toxic killing substance to capture and kill wasps such as yellow jackets.

2. Description of the Prior Art

The modern history of insect control is replete with proposed solutions to the problem of attracting and removing undesirable insects from the environment in which people wish to conduct activity.

Should a movie company wish to conduct a shoot in a remote location which is infested with wasps, the expense of any delay caused by the fear of being stung may ultimately cause the project to be abandoned or moved to a more controlled site.

Most current insect control procedures utilize chemical warfare to "control" the environment with a massive spray program. Unfortunately, this tactic may also inflict irreparable damage upon the environment.

Some new methods rely upon ferimons to attract the insects into a trap but then use poison bait in the trap to kill the insects. The poison bait is still harmful to the environment and a potential threat to the users and unsupervised children and pets of the users.

One of the insects usually found at remote sites, camp grounds, etc. is the yellow jacket.

The yellow jacket is a small wasp with black and yellow stripes. They belong to the group called social wasps, and are related to hornets. This insect is capable of inflicting multiple stings. They eat the nectar and juices of ride fruit and do some damage to orchards and market gardens.

Thus, there has long been a need for an environmentally friendly method of insect control.

It is desired that such an arrangement use a non-toxic attractant to entice the insects into a trap.

It is further desired at the trap arrangement utilize a non-toxic substance to kill the insects.

SUMMARY OF THE INVENTION

Accordingly, it is an object of the present invention to provide an improved insect control arrangement which does not harm the environment.

It is another object of the present invention to provide a arrangement which may be used for the killing the trapped insects without the use of artificial chemicals, insecticides or poison bait.

It is yet another object of the present invention to provide an arrangement which uses an environmentally safe and inexpensive attractant.

It is yet another object that the apparatus not be toxic to children or pets or build up in the environment to levels which would be toxic to the plants or to humans which harvest the plants protected by the apparatus.

The above and other objects of the present invention are achieved, according to a preferred embodiment thereof, by providing an improved trap containing a truncated, hollow cone with a vertical apron mounted at the base of the cone to hold diatomaceous earth. The cone is mounted in a container having a plurality of openings a preselected distance above a base. An attractant such as HAWAIIAN PUNCH is poured into the base. The yellow jackets enter the holes to get to the attractant. When they are full, they fly up to the too of the cone, walk through the truncated tin of the cone and enter the kill chamber. The diatomaceous earth contained at the base of the cone by the apron will coat the body of the insect and cause contusions and abrasions. The insect will die quickly from loss of bodily fluids. The full trap may be safely handled to dispose of the dead insects coated with diatomaceous earth and rinse out the partially dried HAWIIAN PUNCH.

The diatomaceous earth may be replaced with cooking oil or a mild soapy solution but are not as effective.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which:

FIG. 1 is a perspective view of the assembled apparatus.

FIG. 2 is a perspective view of the apparatus with the parts shown disassembled.

FIG. 3 is a cross sectional view along line 3—3 of FIG. 1.

DESCRIPTION OF A PREFERRED EMBODIMENT

Referring now to the drawing, FIG. 1 shows the preferred embodiment 10 fabricated according to the teaching of this invention.

The apparatus is formed of three basic parts, the base 101, the insert 102 and the lid 103.

The base 101 is unitarily fabricated as a tapered cylinder with a closed bottom. A handle 111 may be mounted on the sides of the base 101 to allow the user to carry and hang the apparatus 10 in a desired location.

A plurality of entrance orifices 110 are formed in the cylinder at a preselected distance above the bottom 112 of the base 101 so that the user may pour an attractant into the base 101 without the attractant leaking out any entrance orifice 110.

The insert 102 is fabricated to form a hollow cone 121. An apron 122 is vertically mounted to the base of the cone 121. The cone 121 is truncated to form a transfer orifice 123. The junction of the apron 122 and the cone 121 form a water tight trough which may be filled with liquid or granular substance such as diatomaceous earth, oil or soapy solution to act as a killing agent. The base of the cone 121 and attached apron 122 are fabricated to have an outside diameter slightly smaller than the inside diameter of the tapered cylinder of the base 101 at a preselected point above the upper most entrance orifice 110.

The height of the cone 121 is selected to allow the insert 102 to be fully inserted within the base 101 so that the cover 103 may be attached to the base 101 and held in place by the lip 131.

It is the apron 122 which allows the device to effectively utilize non-solid, non-toxic material in the kill chamber. The prior art does not disclose the creation of a water-tight area in the kill chamber which is accessible to the tramped insects. The prior art does not disclose the use of diatomaceous earth, oil or soapy solution to act as the killing agent.

An attractant chamber is formed below the insert 102 and a killing chamber is formed above the insert 102.

Each chamber may be filled with a liquid or granular substance without spillage or seepage.

The user may pour an attractant such as HAWAIIAN PUNCH into the base 101, pour diatomaceous earth in the trough formed by the apron 122, place the insert 102 inside the base 101 and snap on the cover 103. The loaded trap arrangement 10 may now be hung by the handle 111 in a preselected place.

The HAWAIIAN PUNCH will attract yellow jackets to the entrance orifice 110. The yellow jackets will climb through the entrance orifiace 110 and fly down to drink the HAWAIIAN PUNCH. After they are full, they characteristically fly up. Upon going up, they encounter the cone 121 which directs them to the transfer orifice 123. The cone may be fabricated as a solid sheet, may be variegated, or may have a woven texture to allow the insect to climb up the inside of the cone and reach the transfer orifice 123. Upon reaching the transfer orifice 123 the insects will climb from the attractant chamber into the killing chamber.

At the base of the killing chamber, the insects will encounter the diatomaceous earth which has sharp edges. The shard edges cause the insects to be cut, lose bodily fluids and die.

The tram arrangement 10 may be removed, to an area without insects, allowed to set for a while to ascertain that all of the trapped insects are dead, and opened for cleaning and refilling with attractant and diatomaceous earth.

In the preferred embodiment, both the attractant and the diatomaceous earth are non-toxic to the user, the user's children, pets, and to the environment.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. An apparatus used as a non-toxic, killing insect trap comprising, in combination:
    a base unitarily fabricated of a tapered cylinder closed at the small diameter end to form a bottom;
    a plurality of entrance orifices formed at a preselected height above said bottom forming a chamber to hold attractant without spilling or leakage;
    an insert fabricated as a hollow cone having a preselected outside diameter at its base and a preselected height, the top of said cone being truncated to form a transfer orifice at the top which is opposite to said base;
    an apron fabricated as a vertical belt and mounted at the base of said cone to form a water tight trough; and,
    a cover having a lip insertable over the open end of said base to inclose said insert within said base;
    whereby the user may bait and assemble the apparatus by pouring a non-solid, non-toxic attractant into said base bottom, pouring a non-solid, non-toxic killing substance into said trough, installing said insert inside said base whereby said insert rests above said entrance orifices and below the top, open end of said base, snapping said cover onto said base and placing said apparatus in an area to attract and kill insects.

2. An apparatus as recited in claim 1, further comprising a handle mounted to the outside surface of said base which may be used to hang the apparatus in an upright position.

3. An apparatus used as a non-toxic, killing insect trap comprising, in combination:
    a base unitarily fabricated of a tapered cylinder closed at the small diameter end to form a bottom;
    a plurality of entrance orifices formed at a preselected height above said bottom forming a chamber to hold attractant without spilling or leakage;
    an insert fabricated as a hollow cone having a preselected outside diameter at its base and a preselected height, the top of said cone being truncated to form a transfer orifice at the top which is opposite to said base;
    an apron fabricated as a vertical belt and mounted at the base of said cone to form a water tight trough; and,
    a cover having a lip insertable over the open end of said base to inclose said insert within said base;
    whereby the user may bait and assemble the apparatus by pouring a non-solid, non-toxic attractant into said base bottom pouring diatomaceous earth into said trough, installing said insert inside said base whereby said insert rests above said entrance orifices and below the top, open end of said base, snapping said cover onto said base and placing said apparatus in an area to attract and kill insects.

* * * * *